United States Patent
Obrecht et al.

(10) Patent No.: US 6,737,478 B2
(45) Date of Patent: May 18, 2004

(54) RUBBER GELS AND RUBBER COMPOUNDS CONTAINING PHENOLIC RESIN ADDUCTS

(75) Inventors: Werner Obrecht, Moers (DE); Anthony Sumner, Köln (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/981,045

(22) Filed: Oct. 16, 2001

(65) Prior Publication Data

US 2002/0161119 A1 Oct. 31, 2002

(30) Foreign Application Priority Data

Oct. 20, 2000 (DE) ......................... 100 52 287

(51) Int. Cl.$^7$ .............. C08L 9/00; C08K 5/07
(52) U.S. Cl. ............ 525/133; 525/137; 525/139; 525/141; 525/154; 525/155; 524/89; 524/91; 524/110; 524/323; 524/343; 524/346; 524/352; 524/353
(58) Field of Search .................. 525/133, 137, 525/139, 141, 154, 155; 524/89, 91, 110, 323, 343, 346, 352, 353

(56) References Cited

U.S. PATENT DOCUMENTS

| | | | |
|---|---|---|---|
| 3,821,133 A | * | 6/1974 | Doran |
| 5,124,408 A | | 6/1992 | Engels et al. ................ 525/215 |
| 5,395,891 A | | 3/1995 | Obrecht et al. ............. 525/194 |
| 6,127,488 A | | 10/2000 | Obrecht et al. .......... 525/333.3 |
| 6,207,757 B1 | | 3/2001 | Obrecht et al. ............. 525/194 |

FOREIGN PATENT DOCUMENTS

| | | |
|---|---|---|
| CA | 2312171 | 12/2000 |
| CA | 2316421 | 2/2001 |
| DE | 197 01 487 | 7/1998 |
| DE | 199 14 459 | 11/2000 |
| DE | 199 42 620 | 3/2001 |
| EP | 1020492 | 7/2000 |
| GB | 1050836 | 12/1966 |

OTHER PUBLICATIONS

Kautschukhandbuch fur die Gumiindustrie, Bayer AG, (month unavailable) 1991, pp. 499–531 Cohedur, Direthaftmittel für die Bindung Faser–Gummi.

M.L. Hallensleben" Chemisch Modifizierte Polymer", Houben–Weyl Methoden der Organischen Chemie, 4$^{th}$ edition, "Makromolekulare Stoffe" part 1–3, Georg Thiem Verlag Stuttgart, NY, (month unavailable) 1987, pp. 1994–2042.

"Phenolharze", Ullmanns Encyclopadie dertechnischen Chemie (4$^{th}$ revised and expanded edition vol. 18, Verlag Chemie GmbH, Weinheim, (month unavailable) 1979, pp. 245–257.

* cited by examiner

Primary Examiner—David J. Buttner
(74) Attorney, Agent, or Firm—Joseph C. Gil; Noland J. Cheung; Jennifer R. Seng

(57) ABSTRACT

The invention relates to rubber compounds comprising at least one double bond-containing rubber, additions of rubber gels, phenolic resin adducts or phenol/formaldehyde condensation products, such as resols or novolaks, and optionally, further fillers and rubber auxiliary substances, and the vulcanizates and molded rubber articles produced from them. The rubber compounds according to the present invention are characterized in the uncrosslinked state by good processability (compound viscosity ML 1+4/100° C.<60 ME) and in the vulcanized state by Shore-A hardness values/23° C.>60, high impact resilience values E/23° C.>60% and a low specific density. The vulcanizates are suitable for the production of industrial rubber articles and for various tire components, such as roll coverings, conveyor belt coverings, belts, spinning cops, seals, golf ball cores, shoe soles and bead compounds, tire carcasses, subtread compounds and tire sidewalls. The compounds are particularly suitable for producing reinforced sidewalls for tires with emergency running properties (inserts for run flat tires).

5 Claims, No Drawings

RUBBER GELS AND RUBBER COMPOUNDS CONTAINING PHENOLIC RESIN ADDUCTS

FIELD OF THE INVENTION

The present invention concerns rubber compounds which, in addition to the conventional compound components, contain crosslinked rubber particles (known as rubber gels), phenolic resin adducts or phenol/aldehyde condensation products and which are characterized in the uncrosslinked state by good processability (compound viscosity—ML 1+4/ 100° C.$\leq$60 ME) and in the vulcanized state by Shore-A hardness values/23° C.$\geq$60, moduli at 100% elongation ($S_{100}$)$\geq$3.0 Mpa and by high impact resilience values at 70° C. (E70° C.>60%). Moreover, the vulcanizates produced from the rubber compounds according to the present invention have a low density, which has an advantageous effect on the weight of molded rubber articles manufactured from the vulcanizates, particularly in the case of tires or tire components.

BACKGROUND OF THE INVENTION

It is known that rubber compounds consisting of uncrosslinked rubbers and crosslinked rubber particles (rubber gels) display a low specific weight and low compound viscosities and when vulcanized with conventional vulcanizing agents (e.g. sulfur vulcanization) produce vulcanizates that demonstrate good impact resilience values at 70° C. and therefore, low damping under operating conditions.

Reference is made in this connection by way of example to U.S. Pat. No. 5,124,408, U.S. Pat. No. 5,395,891, DE-A 197 01 488.7, DE-A 197 01 487.9, DE-A 199 29 347.3, DE-A 199 39 865.8, DE-A 199 42 620.1 and DE-A 19701487.1.

The mechanical properties of gel-containing rubber vulcanizates are not adequate for industrial use, particularly by reason of a poor reinforcing effect on the part of the microgels. The modulus at 100% elongation ($S_{100}$), the elongation at break (D) and the tear strength (F) need to be improved.

These improvements need to be made without impairing the advantageous compound viscosities in the unvulcanized rubber compounds.

The use of phenolic resin adducts such as resorcinol and formaldehyde donors such as hexamethylene tetramine for the production of so-called adhesive compounds is known. With the aid of these adhesive systems, the rubber compound can be bonded to reinforcing materials such as metal cord, glass fabric, polyamide or polyester fabrics (Kautschukhandbuch für die Gummiindustrie, Bayer AG, 1991, p. 499–531). However, the use of phenolic resin adducts and of condensed phenolic resins to improve the mechanical properties (modulus, elongation at break, tear strength) without impairing the processability (compound viscosity) of rubber compounds containing rubber gels is not taught in the published literature.

SUMMARY OF THE INVENTION

Therefore, there was a technical need to find measures to increase the level of mechanical values in gel-containing rubber vulcanizates, particularly the product of modulus at 100% elongation and elongation at break ($S_{100}$×D), whereby the compound viscosity of the unvulcanized compounds and the tear strength of the vulcanizates should not be impaired by these measures.

DETAILED DESCRIPTION OF THE INVENTION

The present invention, therefore, provides rubber compounds containing uncrosslinked, double bond-containing rubbers (A), crosslinked rubber particles (B) and phenolic resin adducts or condensed phenolic resins (C), whereby the double bond-containing rubbers (A) are present in quantities of 100 parts by weight, the crosslinked rubber particles (B) in quantities of 10 to 150 parts by weight, preferably 20 to 120 parts by weight, and the quantity of phenolic resin adducts or condensed phenolic resins (C) in quantities of 0.1 to 50 parts by weight, preferably 0.5 to 30 parts by weight.

The rubbers according to the present invention can naturally also contain additional fillers and rubber auxiliary substances that are known.

Component (A) of the rubber compounds according to the present invention contains double bond-containing rubbers designated as R rubbers according to DIN/ISO 1629. These rubbers have a double bond in the main chain. They include, for example:

| | |
|---|---|
| NR: | Natural rubber |
| IR: | Polyisoprene |
| SBR: | Styrene-butadiene rubber |
| BR: | Polybutadiene rubber |
| NBR: | Nitrile rubber |
| IIR: | Butyl rubber |
| BIIR: | Brominated isobutylene-isoprene copolymers with bromine contents of 0.1 to 10 wt. % |
| CIIR: | Chlorinated isobutylene-isoprene copolymers with chlorine contents of 0.1 to 10 wt. % |
| HNBR: | Hydrogenated or partially hydrogenated nitrile rubber |
| SNBR: | Styrene-butadiene-acrylonitrile rubber |
| SIBR: | Styrene-isoprene-butadiene rubber |
| CR: | Polychloroprene |
| ENR: | Epoxidized natural rubber or mixtures thereof |
| X-NBR: | Carboxylated nitrile rubbers |
| X-SBR: | Carboxylated styrene-butadiene copolymers. |

Double bond-containing rubbers should also, however, be understood to include rubbers, which are designated as M rubbers according to DIN/ISO 1629 and contain double bonds in the side chain in addition to the saturated main chain. These include EPDM, for example.

The double bond-containing rubbers of the above-mentioned type for use in the rubber compounds according to the present invention can naturally be modified by functional groups that react with phenolic resin adducts or with precondensed phenolic resin adducts and—as is described below—are capable of improving the coupling of the crosslinked rubber particles to the surrounding rubber matrix in the vulcanized state.

In particular, uncrosslinked rubbers that are functionalized by hydroxyl, carboxyl, amino, amido and/or epoxy groups are more preferred. Functional groups can be introduced directly during polymerization by means of copolymerization with suitable comonomers or after polymerization by means of polymer modification.

The introduction of such functional groups by polymer modification is known and described for example in M. L. Hallensleben "Chemisch modifizierte Polymere" in Houben-Weyl Methoden der Organischen Chemie, 4$^{th}$ edition, "Makromolekulare Stoffe" part 1–3; Georg Thieme Verlag Stuttgart, New York, 1987, p. 1994–2042; DE-A 2 653 144, EP-A 464 478, EPA 806 452 and German patent application DE 198 32 459.6.

The quantity of functional groups in the rubbers is conventionally 0.05 to 25 wt. %, preferably 0.1 to 10 wt. %.

Component (B) of the rubber compounds according to the present invention comprises crosslinked rubber particles known as rubber gels or microgels, which can be obtained by appropriate crosslinking of the following rubbers:

| | |
|---|---|
| BR: | Polybutadiene |
| ABR: | Butadiene-$C_{1-4}$ alkyl acrylate copolymers |
| IR: | Polyisoprene |
| SBR: | Styrene-butadiene copolymers with styrene contents of 1–60, preferably 5–50 wt. % |
| X-SBR: | Carboxylated styrene-butadiene copolymers |
| FKM: | Fluororubber |
| ACM: | Acrylate rubber |
| NBR: | Polybutadiene-acrylonitrile copolymers with acrylonitrile contents of 5–60, preferably 10–50 wt. % |
| X-NBR: | Carboxylated nitrile rubbers |
| ENR: | Epoxidized natural rubber |
| CR: | Polychloroprene |
| IIR: | Isobutylene-isoprene copolymers with isoprene contents of 0.5–10 wt. % |
| BIIR: | Brominated isobutylene-isoprene copolymers with bromine contents of 0.1 to 10 wt. % |
| CIIR: | Chlorinated isobutylene-isoprene copolymers with chlorine contents of 0.1 to 10 wt. % |
| HNBR: | Partially and fully hydrogenated nitrile rubbers |
| EPM: | Ethylene-propylene copolymers |
| EPDM: | Ethylene-propylene-diene terpolymers |
| EAM: | Ethylene-acrylate copolymers |
| EVM: | Ethylene-vinyl acetate copolymers |
| CO and ECO: | Epichlorohydrin rubbers |
| Q: | Silicone rubbers |
| AU: | Polyester urethane polymers |
| EU: | Polyether urethane polymers. |

The rubber particles for use according to the present invention conventionally have particle diameters from 5 to 1000 nm, preferably 10 to 600 nm (diameters stated according to DIN 53 206).

Their crosslinking makes them (almost) insoluble and in suitable precipitants, e.g. toluene, swellable. The (insoluble) gel content of the rubber particles is conventionally 80 to 100 wt. %, preferably 90 to 100 wt. %. The swelling index of the rubber particles ($Q_i$) in toluene is approx. 1 to 15, preferably 1 to 10.

The swelling index Qi is defined as:

$$Qi = \frac{\text{Wet weight of the toluene} - \text{containing gel}}{\text{Dry weight of the gel}}$$

To determine gel content and swelling index, 250 mg of gel are swelled for 24 h in 25 ml toluene with shaking. The (insoluble) gel content is centrifuged off at 20,000 rpm and weighed (wet weight of the toluene-containing gel) and then dried at 70° C. to constant weight and weighed again.

Production of the crosslinked rubber particles (rubber gels) to be used from the base rubbers of the previously mentioned type is known in principle and described for example in U.S. Pat. No. 5,395,891 and EP-A 981 000 49.0.

It is also possible to increase the particle sizes of the rubber particles by means of agglomeration. The production of silica/rubber hybrid gels by coagglomeration is also described for example in German patent application DE-A 199 39 865.8.

Naturally, the crosslinked rubber particles, like the above-mentioned uncrosslinked double bond-containing rubbers, can likewise be modified by suitable functional groups, which—as mentioned previously—are capable of reacting with phenolic resin adducts or with precondensed phenolic resin adducts and/or improve the coupling of the rubber particles to the surrounding rubber matrix in the vulcanized state.

Modified crosslinked rubber particles that are surface modified with hydroxyl, carboxyl, amino, amido and epoxy groups and are present in the previously mentioned quantity range are preferably used in the rubber compounds according to the present invention.

Modification of the crosslinked rubber particles (rubber gels) and introduction of the previously mentioned functional groups is likewise known to the person skilled in the art and described for example in German patent application No.199 19 459.9, 199 29 347.3, 198 34 804.5.

Reference is made at this point only to the modification of the corresponding rubbers or rubber gels in aqueous dispersion with corresponding polar monomers, which are capable of introducing a hydroxyl, amino, amido, carboxyl and/or epoxy group into the rubbers.

Component (C) of the rubber compounds according to the present invention contains phenolic resin adducts or precondensed phenolic resin adducts. These are described for example in the chapter entitled "Phenolharze" in Ullmanns Encyclopädie der technischen Chemie ($4^{th}$ revised and expanded edition, volume 18, Verlag Chemie GmbH, Weinheim, 1979, p. 245–257). Phenolic resin adducts are taken to refer to phenol and phenol derivatives and to aldehydes and aldehyde derivatives.

Suitable examples, in addition to phenol, include alkylated phenols, cresols, bisphenol A, resorcinol and formaldehyde, particularly in capped form as paraformaldehyde and as hexamethylene tetramine, as well as higher aldehydes, such as butyraldehyde, benzaldehyde, salicylaldehyde, acrolein, crotonaldehyde, acetaldehyde and glyoxal. Mixtures of phenol or resorcinol with paraformaldehyde and/or hexamethylene tetramine are particularly suitable.

The condensation products of phenols and aldehydes can also be used in place of the phenolic resin adducts. These are known as novolaks and resols ("Phenolharze" in Ullmanns Encyclopätdie der technischen Chemie, $4^{th}$ revised and expanded edition, volume 18, Verlag Chemie GmbH, Weinheim, 1979, p. 245–257). Novolaks and resols based on phenol and/or resorcinol and formaldehyde are particularly suitable.

The rubber compounds according to the present invention can also contain further fillers and rubber auxiliary substances in addition to the compound components (A), (B) and (C).

Suitable fillers for production of the rubber compounds and vulcanizates according to the present invention are:

Carbon blacks. The carbon blacks for use, in this connection, are produced by the lamp black, furnace black or channel black method and have BET surface areas of 20–200 $m^2/g$, such as e.g.: SAF, ISAF, IISAF, HAF, FEF or GPF carbon blacks.

Silica produced e.g. by precipitation of solutions of silicates or by flash hydrolysis of silicon halides with specific surface areas of 5–1000, preferably 20–400 $m^2/g$ (BET surface area) and primary particle sizes of 5–400 nm. The silicas can optionally, also be present as mixed oxides with other metal oxides, such as Al, Mg, Ca, Ba, Zn and Ti oxides. If silicas are used, they are preferably used in activated form, i.e. in combination with compounds such as bis(triethoxysilylpropyl disulfane), e.g. Si®69 from Degussa-Hüls, in quantities of 0.5–20 parts by weight, preferably 1–10 parts by weight.

Synthetic silicates, such as aluminum silicate, alkaline-earth silicate, such as magnesium silicate or calcium silicate, with BET surface areas of 20–400 m$^2$/g and primary particle diameters of 5–400 nm.

Natural silicates, such as kaolin and other naturally occurring silicas.

Metal oxides, such as zinc oxide, calcium oxide, magnesium oxide, aluminum oxide.

Metal carbonates, such as calcium carbonate, magnesium carbonate, zinc carbonate.

Metal sulfates, such as calcium sulfate, barium sulfate.

Metal hydroxides, such as aluminum hydroxide and magnesium hydroxide.

Glass fibers and glass fiber products (strips, strands or glass microbeads).

Thermoplastic fibers (polyamide, polyester, aramide).

Thermoplastic fillers, such as polyethylene, polypropylene, polytetrafluoroethylene, syndiotactic 1,2-polybutadiene, trans-1,4-polybutadiene, syndiotactic polystyrene and polycarbonate.

The rubber compounds according to the present invention contain further rubber auxiliary substances, such as crosslinking agents, reaction accelerators, antioxidants, heat stabilizers, light stabilizers, anti-ozonants, processing aids, plasticizers, tackifiers, blowing agents, dyestuffs, pigments, waxes, resins, extenders, organic acids, retarders, metal oxides, as well as filler activators, such as e.g. triethanolamine, polyethylene glycol, hexane triol, bis (triethoxysilylpropyl) tetrasulfide or others known to the rubber industry.

The rubber auxiliary substances are used in conventional quantities, which are governed inter alia by the intended application. Conventional quantities are, for example, quantities in the range from 0.1 to 50 parts by weight, relative to the quantities of rubber (A) used.

Sulfur, sulfur donors, peroxides or other crosslinking agents, such as e.g. diisopropenyl benzene, divinyl benzene, divinyl ether, divinyl sulfone, diallyl phthalate, triallyl cyanurate, triallyl isocyanurate, 1,2-polybutadiene, N,N'-m-phenylene maleimide and/or triallyl trimellitate, can conventionally be used as crosslinking agents. Other possibilities include the acrylates and methacrylates of polyhydric, preferably dihydric to tetrahydric $C_2$ to $C_{10}$ alcohols, such as ethylene glycol, propanediol-1,2-butanediol, hexanediol, polyethylene glycol with 2 to 20, preferably 2 to 8, oxyethylene units, neopentyl glycol, bisphenol A, glycerol, trimethyl propane, pentaerythritol, sorbitol with unsaturated polyesters of aliphatic diols and polyols together with maleic acid, fumaric acid and/or itaconic acid. The quantity of crosslinking agents is conventionally 0.1 to 20 parts by weight, preferably 0.1 to 10 parts by weight, relative to the total quantity of rubber.

The rubber compounds according to the present invention can also contain vulcanization accelerators. Examples of suitable vulcanization accelerators are e.g. mercaptobenzothiazoles, mercaptosulfenamides, guanidines, thiurams, dithiocarbamates, thio ureas, thiocarbonates and dithiophosphates. The vulcanization accelerators, sulfur, sulfur donors, peroxides or other crosslinking agents, such as e.g. dimeric 2,4-toluylidene diisocyanate (=Desmodur TT) or 1,4-bis-1-ethoxyhydroquinone (=crosslinker 30/10), are used in quantities ranging from 0.1 to 40 parts by weight, preferably 0.1 to 10 parts by weight, relative to the total quantity of rubber.

The rubber compounds according to the present invention are produced by mixing the individual components in suitable equipment, such as rolls, internal mixers or compounding extruders. Preferred compounding temperature are in the range from around 50 to 180° C.

Prefabricated mixtures of individual components, e.g. in the form of masterbatches, can also be used. Gel/rubber masterbatches can be prepared in the latex state, for example, by mixing the latices of uncrosslinked rubbers and of rubber gels. The components of the masterbatches prepared in this way can be isolated conventionally by means of evaporation, precipitation or freeze coagulation (U.S. Pat. No. 2,187,146). Suitable masterbatches and even the rubber formulations according to the present invention can be obtained by incorporating further components, such as fillers, phenolic resins, into the latex blend and then working it up.

Vulcanization of the rubber compounds according to the present invention is performed at temperatures in the range from 100 to 250° C., preferably 130 to 180° C., optionally under pressure of 10 to 200 bar.

The invention also provides the use of the rubber compounds to produce rubber vulcanizates that can be used to manufacture molded rubber articles.

The vulcanizates are particularly suitable for producing industrial rubber articles and for various tire components. Examples include roll coverings, conveyor belt coverings, belts, spinning cops, seals, golf ball cores, shoe soles and various tire components, such as bead compounds, tire carcasses, subtread compounds and tire sidewalls. The compounds are particularly suitable for producing reinforced sidewalls for tires with emergency running properties (inserts for run flat tires).

EXAMPLES

The production of the rubber gels and gel/rubber masterbatches used for these investigations is already described elsewhere in detail. For that reason, reference is simply made here to the relevant patents or applications.

KA 8650/19 is the NR masterbatch of an SBR gel. The masterbatch contains SBR gel and NR in the weight ratio 50/50. The SBR gel and the NR masterbatch are produced as described in EP 854 170 A1, example 1. Characteristic product data are presented in the table below.

KA 8648/47 is the NR masterbatch of a BR gel. The masterbatch contains BR gel and NR in the weight ratio 70/30. The BR gel is produced as described in U.S. Pat. No. 5,395,891, whereby 1.5 phr (parts per one hundred parts of rubber) are used for crosslinking with dicumyl peroxide. The masterbatch is produced in the same way as in EP 854 170 A1. Characteristic product data are presented in the table below.

TABLE 1

| NR master batch | Proportions by weight of gel/NR | Characteristic features of the rubber gel | | | | |
|---|---|---|---|---|---|---|
| | | DCP [phr] | Diameter d50 [nm] | Gel content [%] | QI | Tg [° C.] | Density [g/cm$^3$] |
| KA 8648/47 | 70/30 | 1.5 | 118 | 97 | 6.1 | −63 | 0.9433 |
| KA 8650/19 | 50/50 | 1.5 | 56 | 98 | 4.9 | −23 | 0.9819 |

Compounding, Vulcanization and Vulcanizate Properties

The compound components according to the formulations below were compounded on a roll in the specified sequence, vulcanized and characterized:

Compound series A:

In this series of compounds, it is demonstrated that the processing behavior (compound viscosity ML 1+4/100° C. and Mooney relaxation MR 30) and mechanical properties, particularly $S_{100} \times D$ and the tear strength of rubber compounds containing BR gels and silica are improved both by additions of resorcinol and by additions of resorcinol and hexamethylene tetramine.

TABLE 2

| Compound no.: | 1 | 2 | 3 | 4 |
|---|---|---|---|---|
| Natural rubber[1] | 34 | 34 | 34 | 34 |
| BR gel KA 8648/(70 wt. % in NR) | 86 | 86 | 86 | 86 |
| Buna CB ® 65[2] | 40 | 40 | 40 | 40 |
| Carbon black N 330 | 2 | 2 | 2 | 2 |
| Silica VN 3 | 30 | 30 | 30 | 30 |
| Si 69 ®[3] | 5 | 5 | 5 | 5 |
| Cohedur RS[4] | 0 | 5 | 5 | 5 |
| Renopol L[5] | 5 | 5 | 5 | 5 |
| Zinc oxide | 5 | 5 | 5 | 5 |
| Stearic acid | 2 | 2 | 2 | 2 |
| TMQ[6] | 1.5 | 1.5 | 1.5 | 1.5 |
| 6PPD[7] | 2.5 | 2.5 | 2.5 | 2.5 |
| Sulfur | 3 | 3 | 3 | 3 |
| CBS[8] | 2 | 2 | 2 | 2 |
| Cohedur H 30[9] | 0 | 0 | 3 | 1 |

[1]= SMR 5 (standard Malaysian rubber)
[2]= Star-branched polybutadiene rubber from Bayer AG
[3]= Bis(triethoxysilylpropyl disulfane)(Si 69 ® from Degussa AG)
[4]= Cooled melt of 66.5% resorcinol and 33.5% stearic acid (Cohedur ® RS from Bayer AG)
[5]= Mineral oil-based plasticizer
[6]= 2,2,4-trimethyl-1,2-dihydroquinoline (Vulkanox ® HS from Bayer AG)
[7]= N-1,3-dimethylbutyl-N'-phenyl-p-phenylene diamine (Vulkanox ® 4020 NA from Bayer AG)
[8]= N-cyclohexyl-2-benzothiazyl sulfenamide (Vulkacit ® CZ from Bayer AG)
[9]= Hexamethylene tetramine with 3 wt. % amorphous silica (Cohedur ® H 30 from Bayer AG)

The following quantities were used to characterize the properties of the uncrosslinked compound: Mooney viscosity ML 1+4 (100° C.); Mooney relaxation MR 30 and Mooney scorch at 130° C.

TABLE 3

| | Compound no.: | | | |
|---|---|---|---|---|
| | 1 | 2 | 3 | 4 |
| ML 1 + 4 (100° C.) [ME] | 66.8 | 45.9 | 53.2 | 49.6 |
| MR 30 [%] | 16.8 | 8.1 | 9.2 | 9.7 |

After 15 min vulcanization at 165° C., the following test results were obtained for the above compounds:

TABLE 4

| Compound No.: | 1 | 2 | 3 | 4 |
|---|---|---|---|---|
| Tensile strength [MPa] | 7.3 | 7.8 | 8.1 | 9.3 |
| Elongation at break [%] | 170 | 190 | 140 | 175 |
| Modulus/50% [MPa] | 1.9 | 2.0 | 2.7 | 2.2 |
| Modulus/100% [MPa] | 3.6 | 3.6 | 5.3 | 4.3 |
| Shore-A hardness, 23° C. | 68 | 69 | 75 | 72 |
| Shore-A hardness, 70° C. | 67 | 68 | 74 | 71 |
| Impact resilience, 23° C. [%] | 60 | 57 | 58 | 56 |
| Impact resilience, 70° C. [%] | 73 | 69 | 71 | 68 |
| Goodrich flexometer delta T [° C.] | 12.8 | 12.8 | 14.3 | 13.9 |
| Goodrich flexometer T [° C.] | 122.9 | 130.1 | 126.2 | 125.8 |
| tan δ/60° C. | 0.047 | 0.053 | 0.040 | 0.047 |
| $S_{100} \times D$ | 612 | 684 | 742 | 752 |

Compound series B:

In this series of compounds, it is demonstrated that the processing behavior (compound viscosity ML 1+4/100° C. and Mooney relaxation MR 30) and mechanical properties, particularly $S_{100} \times D$ and the tear strength of silica-free rubber compounds containing either BR gel or SBR gel are improved both by additions of resorcinol and by additions of resorcinol and hexamethylene tetramine.

TABLE 5

| Compound no.: | 5 | 6 | 7 | 8 |
|---|---|---|---|---|
| Natural rubber[1] | 74 | 74 | 40 | 40 |
| BR gel KA 8648 (70 wt. % in NR) | 86 | 86 | | |
| SBR gel KA 8650/19 (50 wt. % in NR) | | | 120 | 120 |
| Carbon black N 330 | 2 | 2 | 2 | 2 |
| Coresin[2] | 2 | 2 | 2 | 2 |
| Cohedur RS[3] | 5 | 0 | 5 | 0 |
| Renopol L[4] | 5 | 5 | 5 | 5 |
| Zinc oxide | 5 | 5 | 5 | 5 |
| Stearic acid | 2 | 2 | 2 | 2 |
| TMQ[5] | 1.5 | 1.5 | 1.5 | 1.5 |
| 6PPD[6] | 2.5 | 2.5 | 2.5 | 2.5 |
| Sulfur | 5 | 5 | 5 | 5 |
| CBS[7] | 2.5 | 2.5 | 2.5 | 2.5 |
| Cohedur H 30[8] | 3 | 0 | 3 | 0 |

[1]= SMR 5 (standard Malaysian rubber)
[2]= Condensation product of t-butyl phenol and acetylene
[3]= Cooled melt of 66.5% resorcinol and 33.5% stearic acid (Cohedur ® RS from Bayer AG)
[4]= Mineral oil-based plasticizer
[5]= 2,2,4-trimethyl-1,2-dihydroquinoline (Vulkanox ® HS from Bayer AG)
[6]= N-1.3-dimethylbutyl-N'-phenyl-p-phenylene diamine (Vulkanox ® 4020 NA from Bayer AG)
[7]= N-cyclohexyl-2-benzothiazyl sulfenamide (Vulkacit ® CZ from Bayer AG)
[8]= Hexamethylene tetramine with 3 wt. % amorphous silica (Cohedur ® H 30 from Bayer AG)

The following quantities were used to characterize the properties of the uncrosslinked compound: Mooney viscosity ML 1+4 (100° C.); Mooney relaxation MR 30 and Mooney scorch at 130° C.

TABLE 6

| Compound no.: | 5 | 6 | 7 | 8 |
|---|---|---|---|---|
| ML 1 + 4 (100° C.) [ME] | 15.9 | 22.3 | 120.4 | 28.1 |
| MR 30 [%] | 1.3 | 1.3 | 1.0 | 2.1 |

After 15 min vulcanization at 165° C., the following test results were obtained for the above compounds:

TABLE 7

| Compound no.: | 5 | 6 | 7 | 8 |
|---|---|---|---|---|
| Tensile strength [MPa] | 6.4 | 5.5 | 12.4 | 11.9 |
| Elongation at break [%] | 160 | 165 | 250 | 255 |
| Modulus/50% [MPa] | 1.6 | 1.3 | 2.4 | 2.0 |
| Modulus/100% [MPa] | 3.5 | 2.6 | 4.4 | 3.4 |
| Shore-A hardness, 23° C. | 65 | 61 | 74 | 68 |
| Shore-A hardness, 70° C. | 64 | 61 | 67 | 63 |
| Impact resilience, 23° C. [%] | 58 | 60 | 33 | 35 |
| Impact resilience, 70° C. [%] | 73 | 76 | 60 | 65 |
| Goodrich flexometer delta T [° C.] | 6.0 | 5.3 | 10.6 | 9.0 |
| Goodrich flexometer T [° C.] | 110.6 | 106.4 | 118.5 | 117.7 |
| tan δ/60° C. | 0.027 | 0.017 | 0.079 | 0.053 |
| $S_{100} \times D$ | 560 | 429 | 1100 | 867 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber compounds consisting of uncrosslinked, double bond-containing rubbers (A), crosslinked rubber particles (B) and a mixture of resorcinol and formaldehyde (C), wherein the double bond-containing rubbers (A) are present in quantities of 100 parts by weight, the crosslinked rubber particles (B) in quantities of 10 to 150 parts by weight and (C) in quantities of 0.1 to 50 parts by weight, and wherein the crosslinked rubber particles (B) are selected from the group consisting of BR, ABR, IR, SBR, X-SBR, SIBR, FKM, ACM, ENR, NR, CR, IIR, BIIR, CIIR, EPM, EPDM, EAM, AVM, CO, ECO, Q, AU and EU and wherein the formaldehyde is in the form of paraformaldehyde or hexamethylene tetramine.

2. Rubber compounds according to claim 1, wherein the double bond-containing rubbers (A) are NR, IR, BR, SBR or SIBR.

3. Rubber compounds according to claim 1, wherein the rubber gels (B) are CR, SBR, Br, or NR gels.

4. Rubber vulcanizates comprising rubber compounds, which consists of uncrosslinked, double bond-containing rubbers (A), crosslinked rubber particles (B) and a mixture of resorcinol and formaldehyde (C), wherein the double bond-containing rubbers (A) are present in quantities of 100 parts by weight, the crosslinked rubber particles (B) in quantities of 10 to 150 parts by weight and (C) in quantities of 0.1 to 50 parts by weight, and wherein the crosslinked rubber particles (B) are selected from the group consisting of BR, ABR, IR, SBR, X-SBR, SIBR, FKM, ACM, ENR, NR, CR, IIR, BIIR, CIIR, EPM, EPDM, EAM, AVM, CO, ECO; Q, AU and EU and wherein the formaldehyde is in the form of paraformaldehyde or hexamethylene tetramine.

5. Molded rubber articles comprising rubber compounds, which consists of uncrosslinked, double bond-containing rubbers (A), crosslinked rubber particles (B) and a mixture of resorcinol and formaldehyde (C), wherein the double bond-containing rubbers (A) are present in quantities of 100 parts by weight, the crosslinked rubber particles (B) in quantities of 10 to 150 parts by weight and (C) in quantities of 0.1 to 50 parts by weight, and wherein the crosslinked rubber particles (B) are selected from the group consisting of BR, ABR, IR, SBR, X-SBR, SIBR, FKM, ACM, ENR, NR, CR, IIR, BIIR, CIIR, EPM, EPDM, EAM, AVM, CO, ECO, Q, AU and EU and wherein the formaldehyde is in the form of paraformaldehyde or hexamethylene tetramine.

* * * * *